US009480361B2

(12) United States Patent
Ozanne et al.

(10) Patent No.: US 9,480,361 B2
(45) Date of Patent: Nov. 1, 2016

(54) CHECK VALVE, INJECTION ASSEMBLY, AND BEVERAGE PREPARATION MACHINE

(71) Applicant: NESTEC S.A., Vevey (CH)

(72) Inventors: Matthieu Ozanne, Champanges (FR); Didier Vuagniaux, Gimel (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/431,373

(22) PCT Filed: Sep. 30, 2013

(86) PCT No.: PCT/EP2013/070334
§ 371 (c)(1),
(2) Date: Mar. 26, 2015

(87) PCT Pub. No.: WO2014/053439
PCT Pub. Date: Apr. 10, 2014

(65) Prior Publication Data
US 2015/0250352 A1    Sep. 10, 2015

(30) Foreign Application Priority Data

Oct. 5, 2012    (EP) .................................... 12187425

(51) Int. Cl.
*A47J 31/057*        (2006.01)
*A47J 31/44*         (2006.01)
(Continued)

(52) U.S. Cl.
CPC .............. *A47J 31/46* (2013.01); *A47J 31/465* (2013.01); *F16K 15/063* (2013.01); *F16K 27/0209* (2013.01); *B67D 2001/0093* (2013.01); *Y10T 137/7935* (2015.04)

(58) Field of Classification Search
None
See application file for complete search history.

(56) References Cited

U.S. PATENT DOCUMENTS 1,674,857 A * 6/1928 Emerson ............... A47J 31/002
                                                126/373.1
3,072,143 A  1/1963 Fleischhaker
(Continued)

FOREIGN PATENT DOCUMENTS

EP        2395269     12/2011
WO      2008148646   12/2008
(Continued)

OTHER PUBLICATIONS

International Search Report for International Application No. PCT/EP2013/070334 mailed on Feb. 21, 2014.
(Continued)

*Primary Examiner* — David Angwin
*Assistant Examiner* — Gyounghyun Bae
(74) *Attorney, Agent, or Firm* — K&L Gates LLP (57) ABSTRACT

The present invention is directed to a check valve 10, an injection assembly 60, and a beverage preparation machine 100, which is integrated in the injection assembly 60. The check valve 10 of the present invention is made of a body with a first fluid outlet 21, and a plug member 30 that is movable inside the body 20. The plug member 30 has a fluid inlet 32 and a second fluid outlet 31 into a first cavity 11, wherein the fluid can exercise a pressure on a first surface 381 of the plug member 30 opposing the first fluid outlet 21. The fluid pressure can overcome the force of an elastic element 40, which biases the plug member 30 into a closed position. If the force of the elastic member 40 is overcome, the plug member 30 is moved into an open position. In the closed position a fluid path from the cavity 11 out of the first fluid outlet 21 is closed, whereas in the open position said fluid path is open. To move the plug member 30 from its initial closed position to its open position, a fluid pressure on the first surface has to be equal to or larger than a predetermined threshold.

3 Claims, 7 Drawing Sheets

(51) Int. Cl.
*F16K 21/04* (2006.01)
*A23L 1/28* (2006.01)
*A47J 31/46* (2006.01)
*F16K 15/06* (2006.01)
*F16K 27/02* (2006.01)
*B67D 1/00* (2006.01)

(56) References Cited

U.S. PATENT DOCUMENTS

| | | | | |
|---|---|---|---|---|
| 3,266,411 | A | * | 8/1966 | Oakley .................. A47J 31/446 210/474 |
| 4,634,027 | A | * | 1/1987 | Kanarvogel .......... B05C 17/002 137/541 |
| 4,702,215 | A | * | 10/1987 | Lebold ............... F02M 37/0023 123/514 |
| 4,759,331 | A | * | 7/1988 | Sausner ............. F02M 51/0678 123/472 |
| 2003/0034073 | A1 | | 2/2003 | Roth |
| 2003/0066431 | A1 | * | 4/2003 | Fanzutti .................. A47J 31/36 99/279 |
| 2006/0260587 | A1 | * | 11/2006 | Woody ..................... F02M 5/14 123/517 |
| 2007/0175334 | A1 | * | 8/2007 | Halliday ............. A47J 31/4492 99/279 |
| 2008/0061081 | A1 | * | 3/2008 | Guerrero ................... A61L 2/18 222/148 |
| 2009/0007793 | A1 | * | 1/2009 | Glucksman ........ B65D 85/8043 99/287 |
| 2009/0007794 | A1 | * | 1/2009 | Cortese ............... A47J 31/3628 99/289 R |
| 2009/0220650 | A1 | * | 9/2009 | Ozanne .............. B65D 85/8043 426/78 |
| 2010/0034942 | A1 | * | 2/2010 | Illy ....................... A47J 31/002 426/433 |
| 2011/0003038 | A1 | * | 1/2011 | Colantonio ........... A47J 31/002 426/80 |
| 2012/0199007 | A1 | * | 8/2012 | Larzul ................. A47J 31/3633 99/281 |

FOREIGN PATENT DOCUMENTS

| | | |
|---|---|---|
| WO | 2009135899 | 11/2009 |
| WO | 2010014201 | 2/2010 |
| WO | 2010081762 | 7/2010 |

OTHER PUBLICATIONS

Written Opinion of the International Searching Authority for corresponding International Application No. PCT/EP2013/070334 mailed on Feb. 21, 2014.

* cited by examiner

CHECK VALVE, INJECTION ASSEMBLY, AND BEVERAGE PREPARATION MACHINE

CROSS REFERENCE TO RELATED APPLICATIONS

The present application is a National Stage of International Application No. PCT/EP2013/070334, filed on Sep. 30, 2013, which claims priority to European Patent Application No. 12187425.9, filed Oct. 5, 2012, the entire contents of which are being incorporated herein by reference.

FIELD OF THE INVENTION

The present invention is directed to a check valve, an injection assembly containing a check valve and a piercing needle, and a beverage preparation machine integrating said injection assembly. In particular, the check valve of the present invention has been developed for safety and compactness reasons.

BACKGROUND OF THE INVENTION

In the state of the art beverage preparation machines are known, which include an injection assembly for injecting a hot fluid into a capsule containing beverage ingredients, in order to brew and dispense a beverage. Typically such beverage preparation machines further include a reservoir for storing a fluid, a heater for heating the fluid received from the reservoir, an air separator for removing air from the heated liquid, and an injection assembly for piercing the capsule and for injecting the fluid into the capsule. In most cases a check valve is located between the air separator and the piercing needle. The check valve opens when fluid is pressurized upstream, and otherwise closes to prevent backflow into the machine.

WO 2009/135899 A1 discloses a beverage preparation device according to the above-described state of the art. The beverage production device comprises means to hold a capsule, means for heating and supplying a fluid, and means for injecting the hot fluid into the capsule. The machine particularly discloses a check valve, which is connected between an air separator and a fluid line to an injection member.

Figure 1:
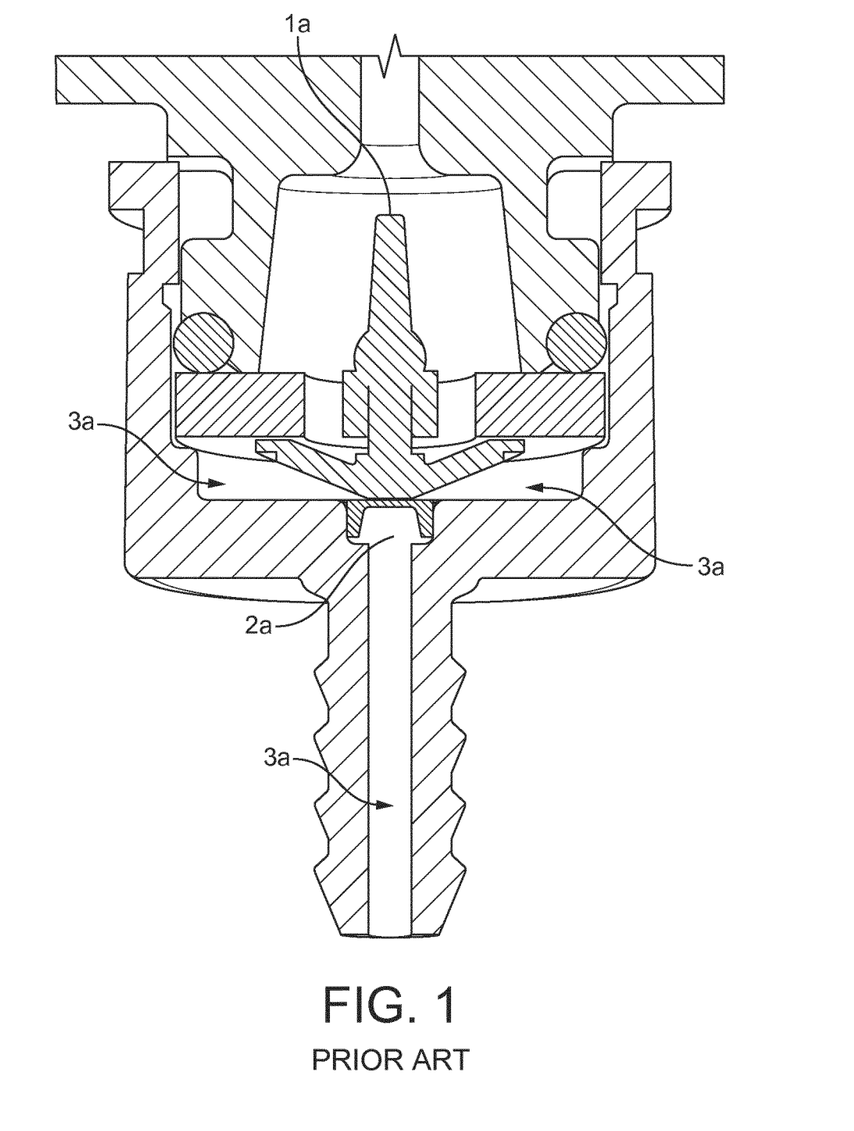
FIG. 1 shows a first design of a check valve according to the prior art.

FIG. 1 of the present application shows the check valve, which is used in WO 2009/135899 A1. The check valve has a water inlet $1a$ and a water outlet $2a$. The check valve design has the disadvantage that between the preparations of two beverages, a large dead volume $3a$ of hot fluid remains between the check valve and the piercing needle. FIG. 1 shows that the dead volume $3a$ appears particularly in cavities within the check valve and in a fluid line downstream of the check valve.

Any dead volume of fluid in a beverage preparation machine is disadvantageous due to safety and health issues. A dead volume can promote the development of bacteria, for example bacteria originating in and/or migrating into the dead volume from a used capsule, which has not yet been ejected or removed from the beverage preparation machine.

Figure 2:
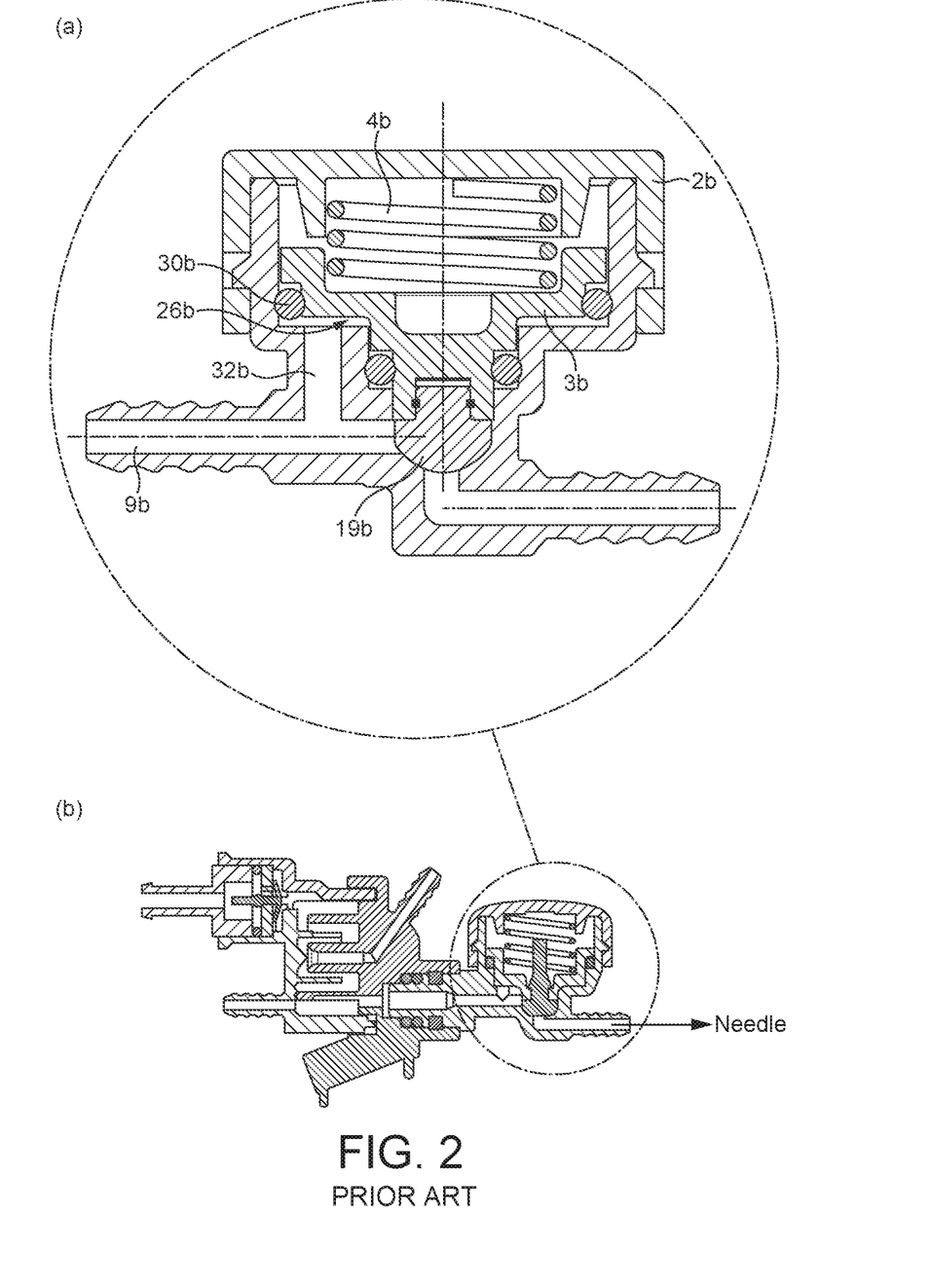
FIG. 2a shows a second design of a check valve according to the prior art.
FIG. 2b shows an integration of such a check valve and an air separator, respectively, into a beverage preparation machine according to the prior art.

EP 2 395 269 A1 discloses a check valve having a reduced dead volume. The check valve 1 is shown in FIG. 2$a$ of the present application and comprises a main body 2$b$ and a plug member 3$b$ inside the body 2$b$. The plug member 3$b$ is subjected to an elastic load 4$b$ housed inside a cavity of the body 2$b$. The plug member 3$b$ is movable. The check valve further comprises a conduit 9$b$, along which a pressurized fluid may flow. In an open position of the plug member 3$b$, the fluid can flow past a head part of the plug member 3$b$, whereas in a closed position of the plug member 3$b$ the fluid flow is interrupted by the head part of the plug member, since the head part engages with a seat 19$b$. The conduit 9$b$ further has an off-take conduit 32$b$ connecting to a chamber 30$b$. Due to the off-take conduit 32$b$ the fluid in the conduit 9$b$ can exert a pressure on a first surface 26$b$ of the plug member 3$b$, and can move the plug member 3$b$ to its open position, if the fluid pressure exceeds a predetermined threshold.

FIG. 2$b$ shows how such a check valve can be integrated with an air separator in a beverage preparation machine. The check valve, however, has the disadvantage that it leaves still a too important dead volume downstream of the check valve, and moreover takes a lot of space in the machine due to its bulky configuration.

In view of the above, the object of the present invention is to overcome the disadvantages of the prior art. In particular, the object of the present invention is to provide a check valve, an injection assembly and a beverage preparation machine, which reduce the risk of bacteria development due to a reduced dead volume, and can additionally be built more compact.

SUMMARY OF THE INVENTION

The main objects of the present invention are solved by the attached independent claims. The attached dependent claims develop further advantages of the invention.

In particular, the present invention is directed to a check valve comprising:
a body defining a cylindrical chamber presenting an upper wall and a lower wall, wherein:
  the upper wall comprises a central opening and
  the lower wall presents a shoulder around a bore,
  the end of said bore comprises a central opening and forms the seat of the valve,
a plug member housed inside the body chamber, the plug member comprising:
  a tube with a bore, said tube extending through the body chamber upper wall central opening,
  a cylindrical sealing element around the tube, said cylindrical sealing element dividing the body chamber in an upper cavity and lower cavity and sealing said cavities one from the other,
  wherein the surface of the cylindrical sealing element facing the lower cavity presents a shoulder around a protruding part, said protruding part being configured to fit inside the bore of the body chamber lower wall to act as the valve member,
  wherein the bore inside the plug member tube extends through the plug member and emerges in the lower cavity of the body chamber, and
an elastic element housed in the body upper cavity in order to press the plug member protruding part against the valve seat.

The check valve could be integrated into a beverage preparation machine as shown in WO 2009/135899 A1. The geometry of the check valve of the present invention is much compacter than the check valves of the prior art. The reason for its compactness is mainly the specific arrangement of the plug member with its fluid inlet and its fluid outlet, and the elastic member inside the body. The check valve can in particular be built such that the valve outlet and inlet are aligned with each other and also with the movement direction of the plug member, in order to achieve maximum compactness.

The check valve of the present invention only opens and lets fluid pass through, when the fluid flow is directed from the valve inlet to the valve outlet. In an opposite fluid direction the pressure on the valve member does not increase beyond the predetermined threshold. The force exerted by the elastic member for biasing the plug member into its closed position is too large to be overcome by typical fluid pressures on the plug member from the valve outlet.

The valve inlet is integrated with the plug member so that it also moves together with the moving plug member. By aligning the plug member, in particular the free movement directions of the plug member, with the orientation of the valve outlet and the valve inlet, a very compact check valve can be built.

Preferably, the elastic member is arranged in the upper cavity of the body chamber. The elastic member does not come into contact with the fluid and therefore has a longer lifetime. Furthermore, the specific arrangement of the elastic member within the body of the check valve favors a compact design of the check valve.

Preferably, the elastic member is a coil spring and said coil spring is wrapped around the tube of the plug member passing through the upper cavity. By wrapping the coil spring around the fluid inlet extending from the second surface through the body, a very compact design of the check valve is possible.

Preferably, the plug member comprises a protruding part protruding from the first surface towards the first fluid outlet, wherein the second fluid outlet of the plug member is arranged on a side surface of the protruding part.

Preferably, the bore inside the plug member tube emerges on a side surface of the plug member protruding part. Thus, the valve outlet and the part of the plug member that is responsible for interrupting the fluid flow to the second fluid outlet are integrated. Thereby, the compactness of the check valve is supported. The end of the protruding part is preferably deformable as to adjust to the shape of the valve outlet, in order to interrupt the fluid flow.

Preferably, the lower part and the upper part of the body are separate parts, which are connected to each other by engaging means. The check valve can thus be easily assembled or disassembled for reasons of exchange or cleaning.

Preferably, the elastic element is connected to the upper part of the body with its first end, and to the second surface of the plug member with its second end. The connection can for example be realized by a releasable snap connection so that the elastic element can be easily installed or removed for purposes of cleaning or adjustment.

Preferably, the central opening in the bore of the body chamber lower wall is designed for attaching an injection needle of a beverage machine. Thus, the assembly of an injection needle and a check valve can be made very compact. Additionally, by attaching the injection needle directly to the valve outlet, the dead volume downstream of the assembly can be reduced to the internal volume of the piercing needle. The check valve exhibits no other downstream cavities, in which a dead volume could remain after beverage preparation.

Preferably, the tube of the plug member is designed for attaching a flexible tube of a beverage machine. The check valve can thus be easily installed inside different beverage preparation machines, e.g. in a machine like described in WO 2009/135899 A1. The flexible tube will move with the movement of the valve.

The present invention is further directed to an injection assembly comprising a check valve according to the above description, a piercing needle for penetrating a capsule containing beverage ingredients, and for injecting fluid into the capsule, wherein the piercing needle is attached to the first fluid outlet.

The injection assembly is with only minor modifications of the machine compatible with a machine as described in WO 2009/135899 A1. The injection assembly has only a very small dead volume of fluid after the production of beverages, particularly a dead volume that is reduced to the internal volume of the piercing needle. The injection assembly is further very compact, and requires less space in the beverage preparation machine. The beverage preparation machine can therefore be designed smaller.

The present invention is further directed to a beverage preparation machine comprising a fluid reservoir for storing a fluid, a heater for heating fluid received from the fluid reservoir, an injection assembly according to the above description, wherein the check valve is connected to receive fluid from the heater; and a dispensing chamber for receiving and holding a capsule containing beverage ingredients, and for dispensing as a beverage the fluid injected by the injection assembly into the capsule.

The beverage preparation machine can be operated with less danger of bacteria migrating to or developing in a dead volume of fluid downstream of the check valve, since the total dead volume is reduced. Further, the beverage preparation machine can be built smaller, since the check valve requires less space in the machine. The beverage preparation machine can be designed similar to the machine presented in WO 2009/135899 A1 with a reconstruction of at least the injection assembly according to the present invention.

Preferably, the beverage preparation machine further comprises an air separator for removing air from the fluid heated in the heater, wherein the check valve is connected to receive substantially airless fluid from the air separator.

The airless fluid enables a more precise and qualitatively improved brewing of the beverage in the beverage preparation machine.

In the present application the terms "upper", "lower", "axial", "side" are used to describe the relational positioning of features of the invention. These terms should be understood to refer to the sense of introduction of the fluid in the valve. Consequently "upper" relates to the part of the valve that is upstream according to the fluid path in the valve and by opposition "lower" relates to the part of the valve that is downstream according to the fluid path in the valve. Similarly "axial" corresponds to the global direction of the fluid between the valve inlet and the valve outlet as illustrated by the axis XX' in FIG. 3 and "side" corresponds to elements oriented perpendicularly to said axis.

BRIEF DESCRIPTION OF THE DRAWINGS

In the following, the present invention will be described in more detail according to the attached figures:

FIGS. 5a and 5b show parts of an injection assembly according to the present invention. In particular.

FIGS. 6a and 6b show parts of a check valve according to the present invention. In particular.

DETAILED DESCRIPTION OF THE DRAWINGS

Figure 3:
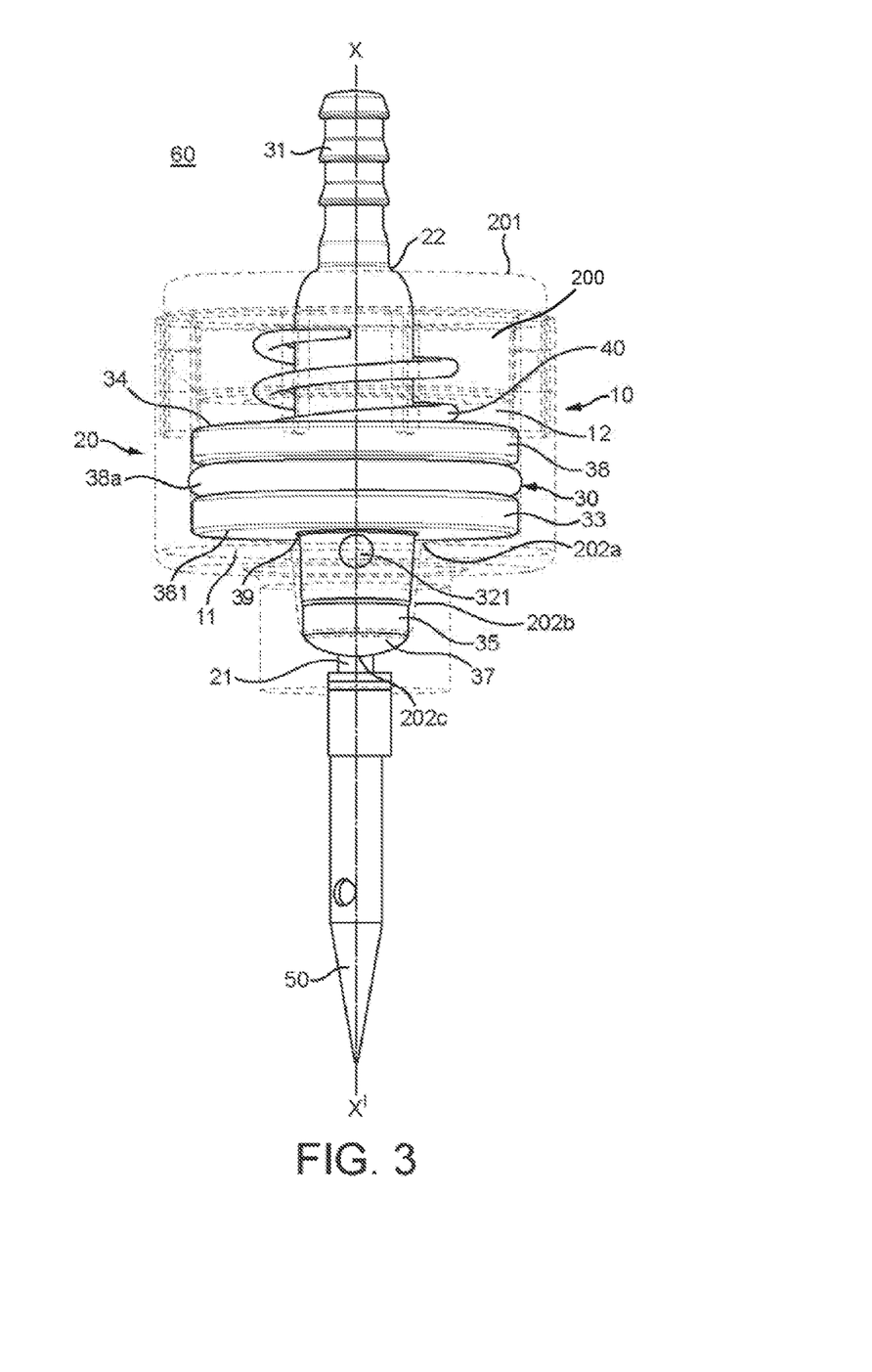
FIG. 3 shows an injection assembly consisting of a check valve and an injection needle according to the present invention.

In FIG. 3 it is shown that an injection assembly 60 according to the present invention comprises a check valve 10 according to the present invention and a piercing needle 50 attached directly to the check valve 10. The piercing needle 50 is suited to penetrate a capsule or cartridge or some other similar container that contains beverage ingredients and is held inside a beverage preparation machine. The piercing needle 50 is further suitable for injecting a fluid, which it receives directly from an outlet of the check valve 10, into the capsule. In the injection assembly 60 according to the present invention, the piercing needle 50 can be directly attached to the fluid outlet 21 of the check valve 10, in order to reduce the dead volume and the size of the injection assembly 60.

The check valve 10 comprises:
a body 20 that has been represented in dotted lines,
a plug member 30, which is disposed at least partially inside the body 20, and
an elastic member 40, which is disposed inside the body 20.

The body 20 defines a cylindrical chamber 200 presenting an upper wall 201 and a lower wall 202. The upper wall 201 comprises a central opening 22. The lower wall 202 presents a shoulder 202a around a bore 202b. The end of said bore 202b comprises a central opening 202c to the outside of the chamber and forms the seat of the valve. The central opening 202c communicates with the fluid outlet 21.

Figure 5:
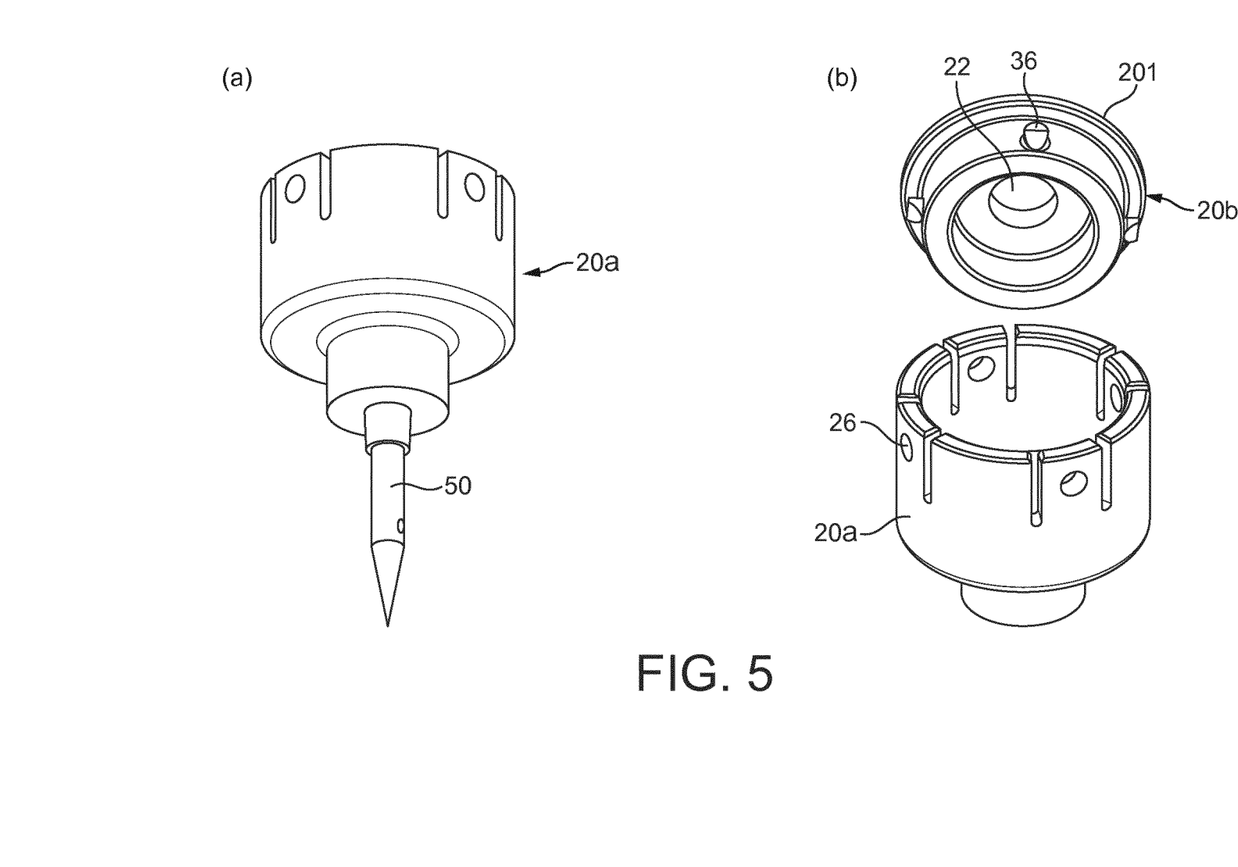
FIG. 5a shows the lower part of the body and the injection needle and FIG. 5b shows the lower part and the upper part of the body.

As illustrated also in FIG. 5 the body 20 is preferably divided into an upper part 20b and a lower part 20a. The upper part 20b can be preferably connected to the lower part 20a by means of engaging means. The engaging means are for example designed as a protrusion 36 provided on the upper part 20b of the body 20 and corresponding holes 26 in the lower part 20a of the body 20. The upper part 20a can in this case be snapped to the lower part 20. However, the present invention is not limited to this kind of engaging means. The body 20 of the check valve 10 is preferably made of a plastic material or a metal. In any case the material of the body 20 is at least impermeable to the fluid used for brewing the beverage.

The body 20 presents a symmetrical shape around axis XX' on which the central opening 22, the bore 202b and the opening 202c are centered.

The body 20 has internal space for housing the plug member 30. The plug member comprises a tube 31 with a bore 32. The inlet of this bore corresponds to the fluid inlet of the valve. This tube 31 extends through the central opening 22 of the body chamber upper wall. The plug member comprises a cylindrical sealing element 38 around the tube 31. This sealing element 38 divides the chamber of the body in an upper cavity 12 and lower cavity 11 and seals said cavities one from the other. This sealing element has a global disc shape extending from the tube 31 to the lateral sides of the body chamber. Preferably it incorporates an O-ring 38a to improve sealing between the two cavities. The lower surface 381 of the cylindrical sealing element that faces the lower cavity 11 presents a shoulder 39 around a protruding part 35. This protruding part 35 is configured to fit inside the bore 202b of the body chamber lower wall to act as the valve member of the check valve. Preferably the lower cavity 11 presents a small volume so as to avoid dead volume of fluid in the valve. For this reason the shape of the plug member is conformal and as close as possible to the shape of the body lower wall 202.

The bore 32 inside the plug member tube 31 extends through the plug member and emerges in the lower cavity 11 of the body chamber. Preferably the bore 32 inside the plug member tube emerges at an outlet 321 on a side surface of the plug member protruding part 35. So the fluid can exit oblique or orthogonal to the tube 31 and the axis XX'. The end of the protruding part 35 can be made of a rubber or plastic material, and is formed to match or resemble as close as possible the internal profile of the bore 202b. Since said end is in contact with the hot fluid it might need to be exchanged after some time. That end part is preferably deformable so as to be able to adapt to the shape of the opening 202c, in order to most efficiently interrupt the fluid flow out of the check valve 10.

Finally the check valve comprises an elastic element 40 housed in the body upper cavity 12 in order to press the plug member protruding part 35 against the valve seat. For example, the elastic member 40 can be a coil spring. The coil spring is further preferably disposed in such a manner in the body 20 that it is wrapped around the tube 31, which preferably extends through the upper cavity 12. Thereby, a compact arrangement of the check valve 10 can be achieved. Preferably the force of the elastic element 40 is set such that at rest the plug member protruding part 35 is pressed against the valve seat that is the central opening 202c.

The fluid outlet 21 is designed to directly attach the injection needle 50. For example, the injection needle 50 could be screwed into or onto the fluid outlet 21 provided with a thread. Alternatively, the injection needle 50 could be snapped onto the fluid outlet 21 provided with a snap connector or similar engaging means. Thus, the dead volume downstream of the check valve 10 is reduced to the internal volume of the injection needle 50. The injection needle 50 is preferably made of plastic or metal.

The fluid inlet at the extremity of the tube 31 is further designed to attach a fluid line or pipe, for instance a flexible tube to deliver fluid from a heater or an air separator, to the fluid inlet. As shown in FIG. 3 the tube 31 can to this end be provided with several protrusions or step-like structures, which allow to easily slide a flexible tube onto the fluid inlet with only small resistance, but prevent the flexible tube from sliding off the fluid inlet by a larger resistance.

The plug member 30 is movable within the body 20 along the direction XX' that is aligned with the injection needle 50. The plug member 30 can move between an open position and a closed position depending on the pressure of the fluid delivered in the valve. In operation fluid is delivered to the bore 32 in the tube 31 that flows through the plug member 30 into the cavity 11, which is formed between the lower surface 381 of the plug cylindrical sealing element 38 and the lower wall of the body chamber 202. Depending on the pressure of the fluid introduced in the lower cavity 11 the plug member can be moved upward against the force of the elastic member 40 and consequently prevents the plug member protruding part 35 from pressing against the valve seat and the central opening 202c; fluid can be delivered through the needle 50.

In its closed position—that is at rest or under a low fluid pressure—the plug member 30 is located closest to the injection needle 50, and the protruding part 35 of the plug member closes the central opening 202c of the bore 202b to interrupt a fluid path from the cavity 11 through the fluid outlet 21 into the injection needle 50. Indeed the elastic member 40 bias the plug member 30 to its closed position, if no fluid is flowing.

In its open position—that is when a higher fluid pressure—pressurized fluid is introduced through the outlet 381 inside the lower cavity 11. If said fluid pressure on the surface 381 of the cylindrical sealing element facing the lower cavity is equal to or larger than a predetermined threshold pressure, the plug member 30 is moved from its closed position, into which it is biased by the elastic member 40, to its open position against the force exerted by the elastic member. This upward movement of the plug member 30 removes its protruding part 35 from the opening 202c at the end of bore 202b that acts as a valve seat. Consequently the fluid path is opened from the inlet at the extremity of the tube 31 down to the needle 50.

When the fluid pressure on the surface 381 of the cylindrical sealing element facing the lower cavity 11 is or drops below the predetermined threshold after the beverage has been prepared, the plug member 30 is moved to its closed position due to the elastic force exerted by the elastic member 40 onto the upper surface 34 of the sealing element 38 of the plug member.

In case that fluid flows in the opposite direction, for instance caused by a back pressure from the injection needle 50 or capsule to the fluid outlet 21, the fluid can only exercise fluid pressure onto the head part 37 of the plug member 30. However, the surface of said head part 37 is designed small enough that the typical fluid pressure cannot overcome the elastic force of the elastic member 40. Only in case fluid pressure is applied to the larger first surface 381, the check valve 10 can be opened.

Figure 4:
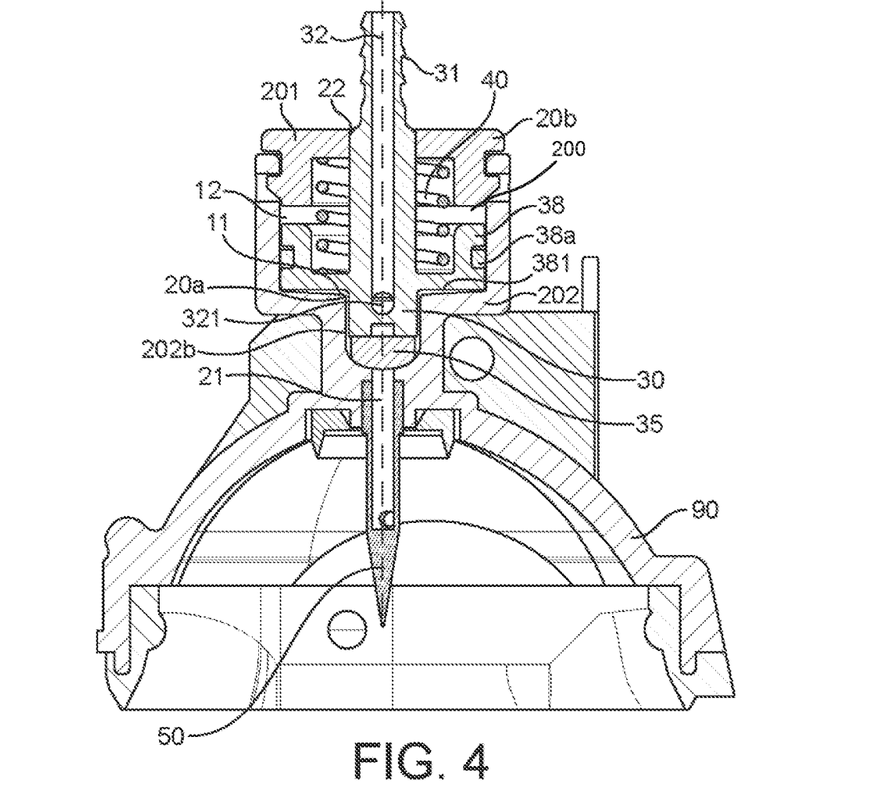
FIG. 4 discloses an injection assembly consisting of a check valve and an injection needle according to the present invention inserted into a dispensing chamber of a beverage preparation machine.

FIG. 4 shows another view of the injection assembly 60 of the present invention. Here the injection assembly 60 is inserted into and is held in a dispensing chamber 90 of a beverage preparation machine. It can be seen that preferably the plug member 30 is provided with sealing means 38, more preferably an O-ring disposed around a cylindrical main body of the plug member 30. The sealing member is designed to seal the lower cavity 11 from the upper cavity 12 so as to prevent any fluid flow from one to the other. Thereby, no fluid can enter into the cavity 12, in which the elastic member 40 is disposed. Also dirt and dust is blocked from entering the first cavity.

As mentioned above the elastic member 40 is for example a coil spring made of metal. Such an elastic member 40 could deteriorate if in permanent contact with the fluid. In the dry upper cavity 12 the life time of the elastic member 40 is prolonged. The sealing means 38 is also suited to guide the movement of the plug member 30 inside the body 20. By means of said guidance movement of the plug member can be restricted to a single axis movement, i.e. a movement in the first and opposite second direction, respectively. Preferably, the movement directions are aligned (i.e. oriented along a same axis) with the orientation of the inlet tube 31 and the injection needle 50.

FIG. 5a is a perspective view from the bottom of the lower part 20A of the body 20, and the injection needle 50, which can directly be attached to the fluid outlet 21, in order to decrease the dead volume downstream of the check valve 10.

In FIG. 5b is a perspective view of the two parts of the body. The opening 22 in the upper part is shown, through which preferably the tube 31 of the plug member 30 extends. Also the engaging means 26, 36 are shown, which are suitable to connect the upper part 20b and lower part 20b of the body 20.

Figure 6:
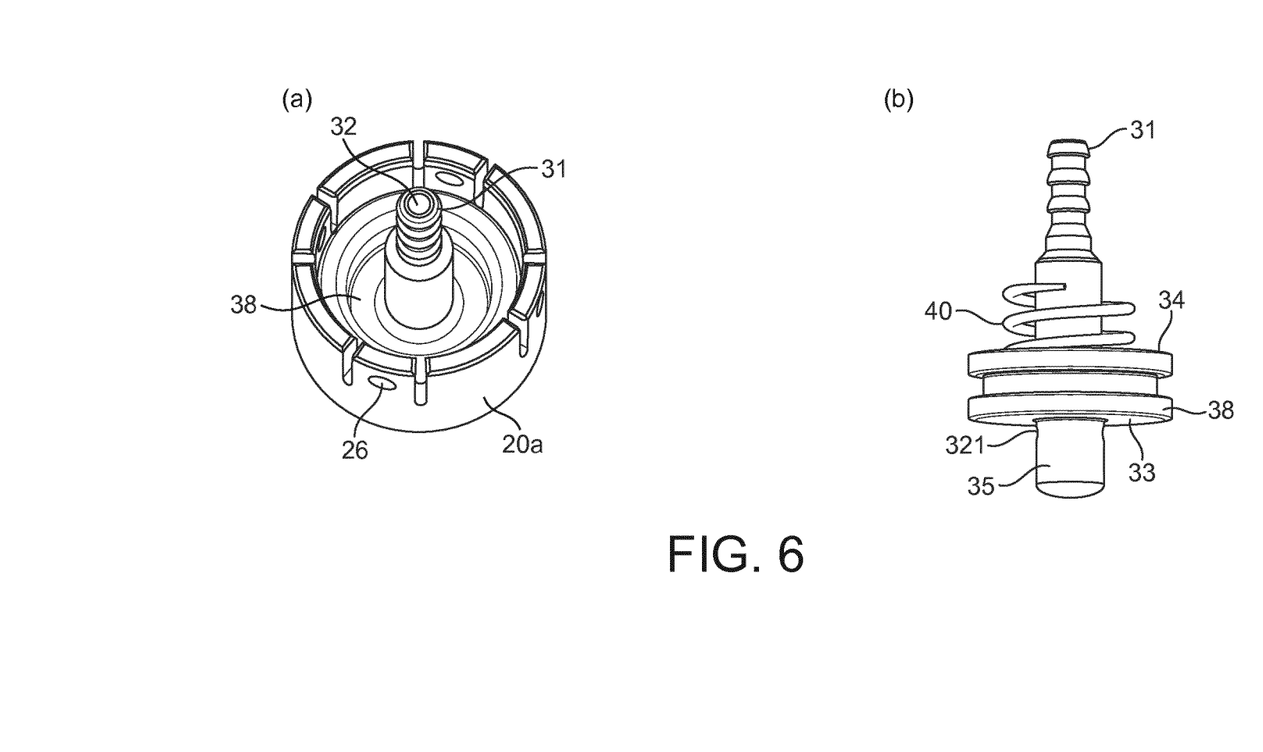
FIG. 6a shows the lower part of the body and the plug member and FIG. 6b shows the plug member and the elastic member.

FIG. 6a is a view from the top showing how the sealing element 38 of the plug member 30 is inserted into the lower part 20a of the body. The plug member 30 fits to the inner shape of the body 20, and is tightly guided, preferably by the sealing means 38, so that only movement in predetermined opposite directions, preferably the first and second directions, is possible.

FIG. 6b is a side view showing the cylindrical sealing element 38 of the plug member 30. The cylindrical portion has the tube 32 protruding from one face 34 thereof, and has the protruding part 35 protruding from the opposite face 33 thereof. The elastic member 40, preferably a coil spring made from a metal, is wrapped around the tube 32. In this way a compact arrangement of the components inside the body 20 is achieved.

Figure 7:
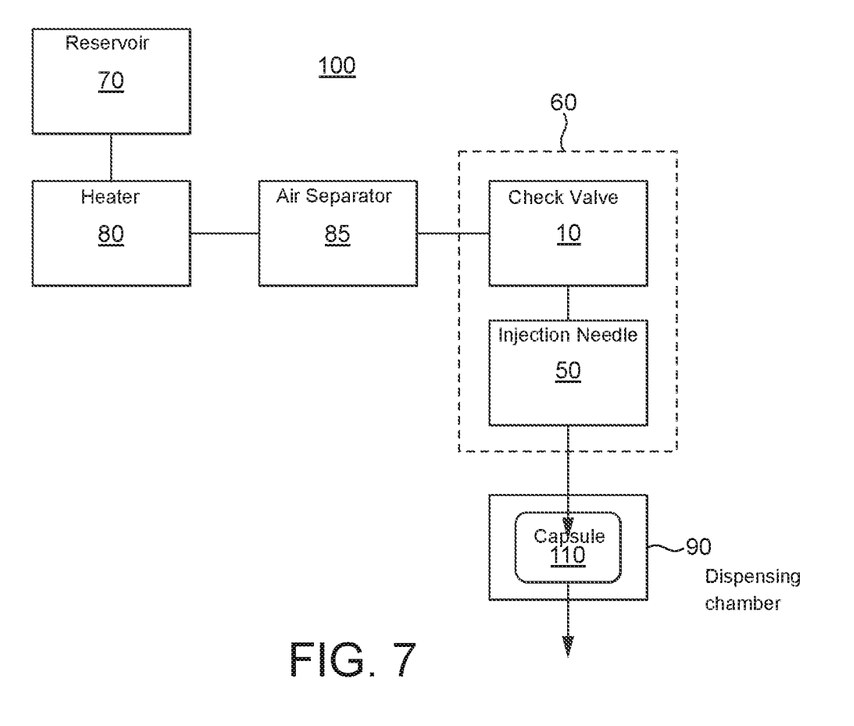
FIG. 7 shows a schematic illustration of a beverage preparation machine integrating an injection assembly according to the present invention.

FIG. 7 shows a schematic diagram of a beverage preparation machine 100, which comprises the injection assembly 60 of the present invention, which again includes the check valve 10 of the present invention and the injection needle 50. The beverage preparation machine 100 comprises at least one water reservoir 70 for storing a fluid, which is used to prepare a beverage. The reservoir 70 is in fluid connection with the heater 80.

The heater 80 receives fluid from the reservoir 70, and is configured to heat up the fluid to a set desired temperature. The temperature can be controlled by the user or automatically depending on the type of capsule in the machine. Therefore, the machine can have means for detecting and identifying an inserted capsule. The temperature can be controlled with a temperature sensor coupled to a control unit, for instance a microprocessor, of the machine. The heater 80 is in fluid connection with the check valve 10.

Optionally, an air separator 85 can be connected between the heater 80 and the check valve 10. An air separator is used for removing air from the heated liquid. The air separator 85 therefore separates the air from the fluid as for example described in WO 2009/135899 A1. For instance the air is separated by means of a special valve and disposed through an air outlet. The airless fluid is further provided to the check valve 10.

The check valve 10 functions as described above, and is directly attached to the injection needle 50. If a beverage is to be dispensed, the injection needle 50 is injected into a capsule 110, which has been inserted into and is held in a dispensing chamber 90 of the beverage preparation machine 100. When the fluid is injected into the capsule 110 the ingredients inside the capsule 110 mix with the heated fluid and a beverage is brewed. After a predetermined amount of time, which can for instance be set automatically according to the detected type of capsule, the heated fluid interacting with the beverage ingredients in the capsule is dispensed from the beverage preparation machine 100 as the final beverage.

After the preparation of each beverage, the only dead volume in the beverage preparation machine according to the present invention is the internal volume of the injection needle. Thus, it is less likely that bacteria migrate to or develop in dead volumes inside the beverage preparation machine. Since furthermore, the injection needle 50 is preferably detachable from the check valve 10, it can be regularly cleaned or replaced so that the risk is further reduced. The beverage preparation machine 100 is consequently safer than beverage preparation machines known from the state of the art.

Moreover, the injection assembly 60 is more compact, since no fluid lines are necessary between the check valve 10 and the injection needle 50. Furthermore, it has been described above how the check valve 10 itself can be built very compact. Therefore, the whole beverage preparation machine can be built smaller.

The invention claimed is:

1. A beverage preparation machine comprising:
   a fluid reservoir configured to store a fluid;
   a heater configured to heat the fluid received from the fluid reservoir;
   an injection assembly comprising (i) a check valve to receive the fluid from the heater and (ii) a piercing needle configured to penetrate a capsule containing beverage ingredients and to inject the fluid into the capsule,
   the check valve comprising
   (1) a body defining a cylindrical chamber presenting an upper wall and a lower wall, the upper wall comprises a first central opening, and the lower wall presents a first shoulder around a first bore, the end of the first bore comprising a second central opening and forming a seat of the check valve,
   (2) a plug member housed inside the cylindrical chamber, the plug member comprising a tube with a second bore, the tube extending through the first central opening in the upper wall of the cylindrical chamber, and a cylindrical sealing element around the tube, the cylindrical sealing element dividing the cylindrical chamber in an upper cavity and a lower cavity and sealing the upper and lower cavities one from the other, the second bore inside the tube of the plug member extends through the plug member and emerges in the lower cavity of the cylindrical chamber,
   (3) a valve member comprising a protruding part configured to fit inside the first bore of the lower wall of the cylindrical chamber, a lower surface of the cylindrical sealing element facing the lower cavity presents a second shoulder around the protruding part,
   and
   (4) an elastic element housed in the upper cavity of the cylindrical chamber and configured to press the protruding part against the seat of the check valve,
   the piercing needle attached to the second central opening in the first bore of the lower wall of the cylindrical chamber; and
   a dispensing chamber configured to receive and hold the capsule containing the beverage ingredients and to dispense as a beverage the fluid injected into the capsule by the injection assembly.

2. The beverage preparation machine according to claim 1, further comprising an air separator configured to remove air from the fluid heated in the heater, wherein the check valve is connected to receive the fluid from the air separator, and the fluid from the air separator is substantially airless.

3. The beverage preparation machine according to claim 1, wherein the plug member comprises the cylindrical sealing element.

* * * * *